Feb. 8, 1938.                M. J. ULINE                2,107,968
                        MACHINE FOR CUTTING ICE
                        Filed Jan. 30, 1935        10 Sheets-Sheet 1

Feb. 8, 1938.  M. J. ULINE  2,107,968
MACHINE FOR CUTTING ICE
Filed Jan. 30, 1935  10 Sheets-Sheet 7

Feb. 8, 1938.   M. J. ULINE   2,107,968
MACHINE FOR CUTTING ICE
Filed Jan. 30, 1935   10 Sheets-Sheet 8

Inventor
M. J. ULINE

Feb. 8, 1938.   M. J. ULINE   2,107,968
MACHINE FOR CUTTING ICE
Filed Jan. 30, 1935   10 Sheets-Sheet 9

Patented Feb. 8, 1938

2,107,968

UNITED STATES PATENT OFFICE 2,107,968

MACHINE FOR CUTTING ICE

Migiel J. Uline, Washington, D. C.

Application January 30, 1935, Serial No. 4,152

21 Claims. (Cl. 143—38)

This invention relates to certain new and useful improvements in machines for cutting ice and more particularly to a machine for cutting blocks of ice into cubes and slabs of various sizes.

Another object of my invention is to provide a machine in which the movement of the ice carriage and saw carriage are so timed in relation to one another that the saw carriage moves across the cakes of ice to form parallel arranged kerfs and then the ice carriage moves under a gang saw to form a plurality of kerfs at right angles to the previously formed kerfs and then under cut-off saws so that the cubes or slabs are cut off from the block and discharged from the machine.

Another object of my invention is to provide novel means for elevating the block of ice within the ice carriage so that the block will be raised in the saw carriage a predetermined distance whereby the kerfs of the gang saws will be of a predetermined depth in order to allow the cubes or blocks formed by the kerfs to be severed from the main block of ice.

Another object of my invention is to provide a novel control for the ice carriage whereby the driving means for the carriage will be disengaged when the door of the machine is in open position to receive a block of ice whereby the ice carriage will always be in its proper position to receive a cake of ice when the door of the machine is open and when the door is closed, the projection of the carriage will be moved into the path of the driving lug of the chain to cause the carriage to move, thereby providing a fool-proof feeding means for the machine.

Another object of my invention is to provide an ice cutting machine in which a single or a double set of gang saws can be used, one set of saws being movable in respect to the other in order to allow said saws to be adjusted and moved into an operative position whereby cubes and slabs of various sizes can be formed.

Another object of my invention is to provide novel means for driving a movable saw carriage and the movable ice carriage whereby these two carriages will be moved in timed relation with one another in order to allow the saw carriage to move across the block of ice when the ice carriage is stationary, the ice carriage then being moved under a set of gang saws and a cut off saw or cut off saws so that the top of the block of ice will be formed with kerfs at right angles to one another to a predetermined depth which can be severed and the cubes or slabs discharged from the machine.

A still further object of the invention is to provide a saw carriage with a pair of projections which are engaged by a driving lug of an endless chain so that the saw carriage will be carried transversely across the cake of ice into a position out of the path of travel of the ice carriage in order to allow the ice carriage to move into engagement with the fixed set of gang saws, the driving chain being so constructed that the lugs are positioned thereon so that one lug moves the saw carriage in one direction and the other lug the saw carriage in the opposite direction whereby the saw carriage will be reciprocated intermittently to allow a cut to be made by the saws and then to allow the ice carriage to be moved and when so moved, the ice carriage is returned to its original position.

Another object of my invention is to provide an ice carriage with a movable platform carried by endless chains which in turn are mounted on sprockets, pawl and ratchet mechanism being provided for intermittently rotating the sprockets to elevate the platform in order to raise the block of ice as the cubes and slabs are cut off the upper end thereof whereby after each cut is made the block of ice will be raised so as to bring another portion of the block into position to be operated on by the saws.

Another object of my invention is to provide novel means for holding the block of ice within the ice carriage, said means being yieldable in order to allow the block to be inserted and held therein.

A still further object of the invention is to provide a lever mechanism in connection with the feed opening of the machine whereby a lever controlling the feed of the ice carriage forms a guard to prevent the block of ice being inserted in the machine when the driving mechanism of the ice carriage is in driving connection with the carriage.

Another object of my invention is to provide novel means for adjusting the plurality of cut off saws whereby each one of these saws can be adjusted independent of the other in order to position the cut off saw to cut off any desired amount from the top of the block of ice.

Other and further objects and advantages of the invention will be hereinafter set forth and the novel features thereof defined by the appended claims.

In carrying out my invention I employ a frame 1 which is preferably formed of an angle iron and is rectangular in shape having a length greater than its width and in the bottom of which is mounted a pair of tracks 2 on which the wheels 3 of an ice carriage 4 are mounted, said carriage being rectangular in shape and formed of a frame constructed of angle irons as clearly shown connected together by bars or plates.

Disposed within the frame 1 are tracks 5 which are engaged by rollers 6 to prevent the ice carriage from tilting when the ice is being cut by the gang saws as will be hereinafter more fully described.

Figure 4:
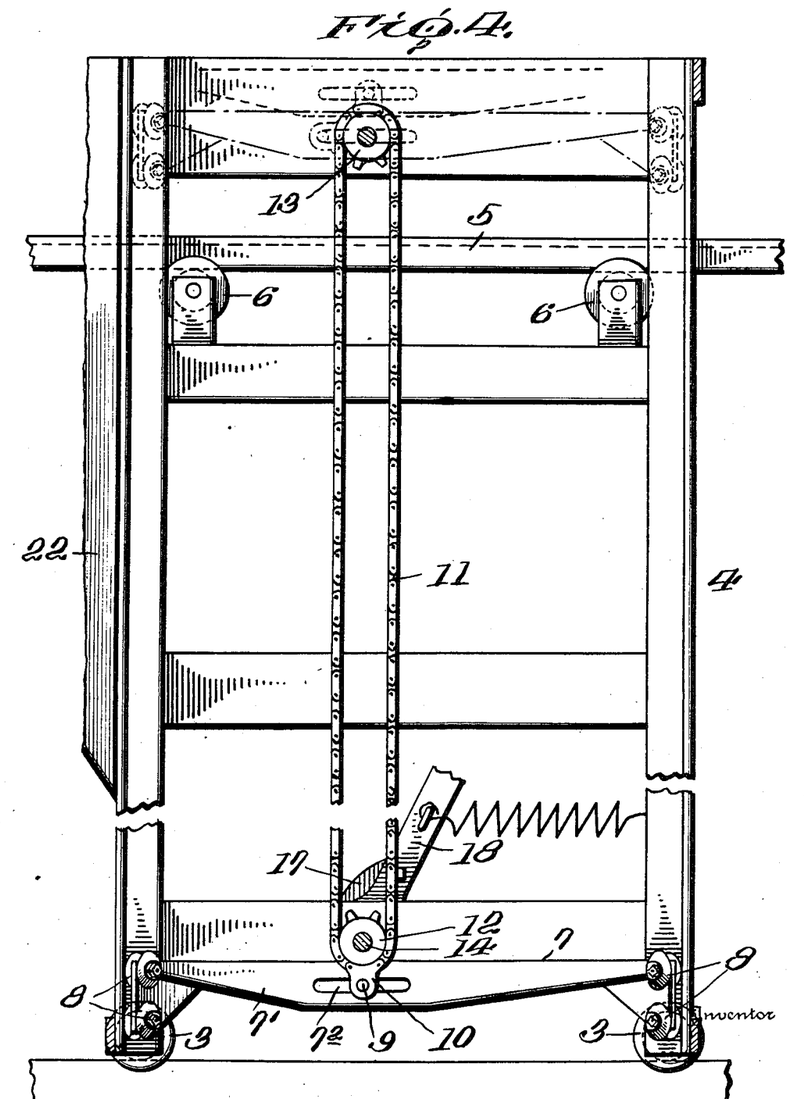
Figure 4 is a vertical section through the ice carriage.
Figure 5:
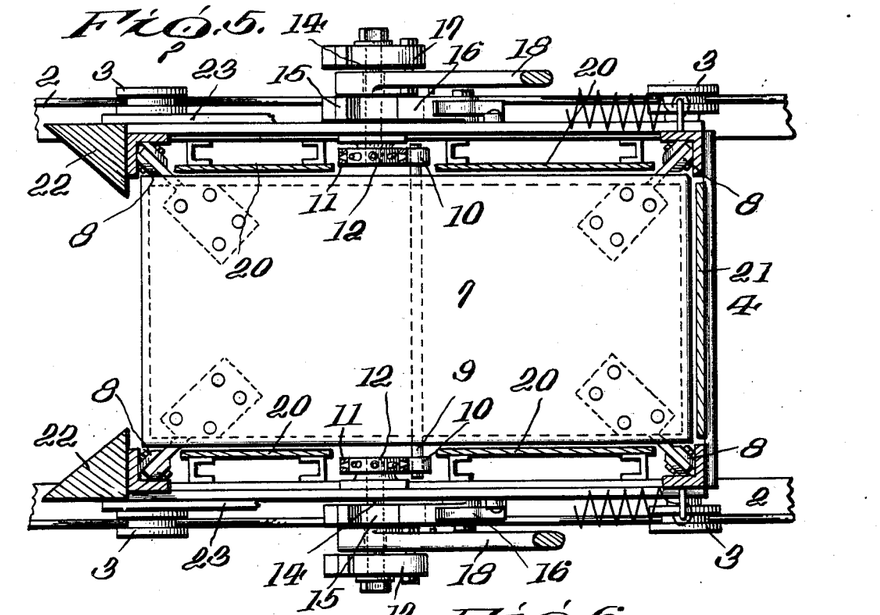
Figure 5 is a horizontal section through the ice carriage.
Figure 6:
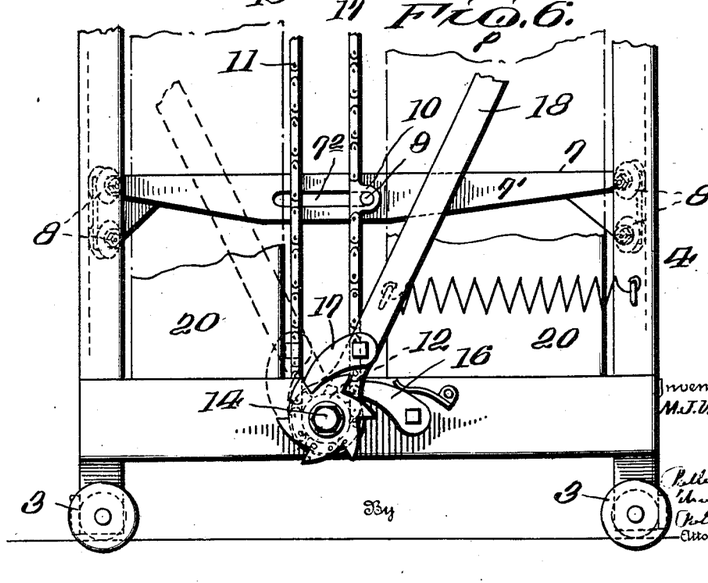
Figure 6 is a detail side elevation of a portion of the ice carriage showing the pawl and ratchet mechanism for operating the elevating chain.
Figure 7:
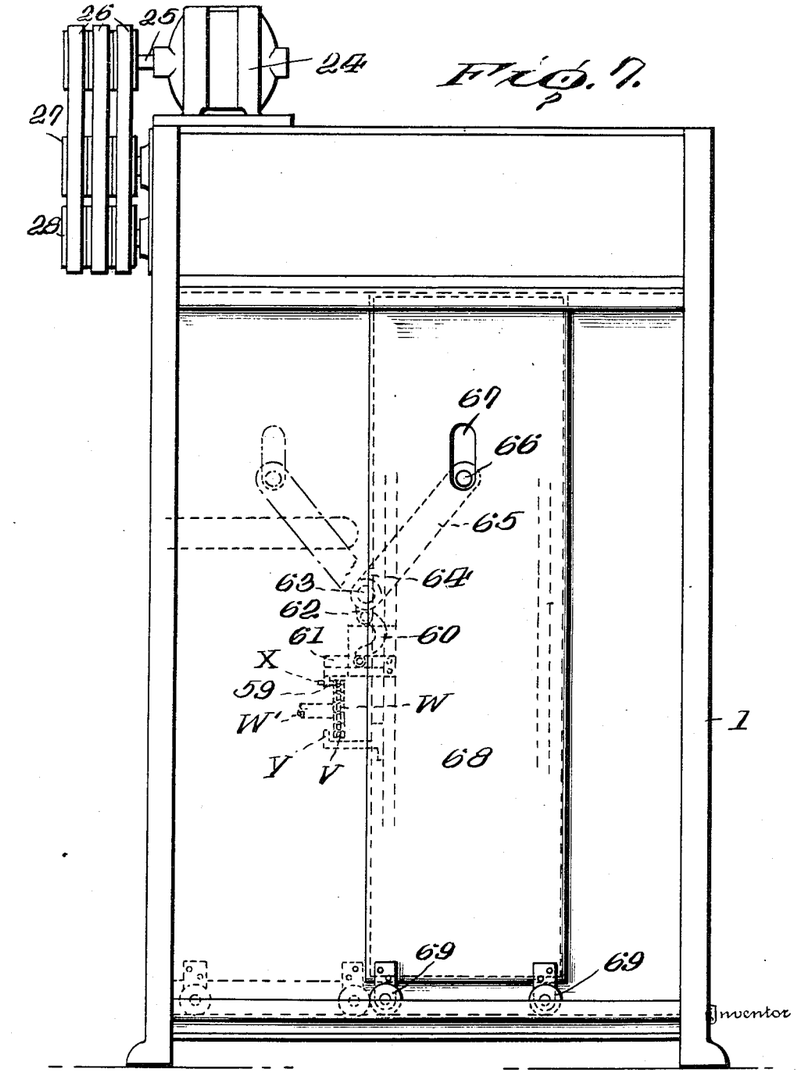
Figure 7 is an end elevation of the feed end of the machine showing the door in closed position over the feed opening with the lever control in such a position that the projection of the carriage is in the path of the driving lug of the drive chain.

Movably mounted within the ice carriage is a platform 7 provided with wheels 8 having beveled faces adapted to travel on the inner faces of the corner of the angle irons of the frame constituting the ice carriage as clearly shown in Figures 4 and 5 whereby this platform will be moved up and down in its proper position.

The platform 7 is provided with side pieces 7' having slots 7² in which travels a rod 9 pivotally mounted in lugs 10 of elevating chains 11 carried by sprocket wheels 12 and 13, an elevating chain being mounted to each side of the platform as clearly shown in Figure 5. The sprockets 12 are mounted on shafts 14 provided with ratchets 15 which are engaged by stop pawls 16 and operating pawls 17 carried by levers 18 which are engaged by members 19 disposed in the path of travel of the ice carriage whereby the elevating chain will be operated as the lever 18 is rocked so as to elevate the platform 7 a predetermined distance, which distance is determined by the number of ratchet teeth formed on the ratchet.

While I have shown a particular construction of pawl and ratchet mechanism for operating the elevating chain, I do not wish to limit myself to any particular construction of pawl and ratchet mechanism as my invention consists in providing a platform which is raised by a pair of elevating chains, which in turn are driven by mechanism operated by the momentum of the ice carriage as it will be apparent that when the carriage is in movement and the operating mechanism is brought into engagement with the fixed projection, the operating mechanism will be operated to drive the elevating chain.

In the construction herein shown, when the carriage is moved to one end of the frame, the operating mechanism raises the platform so as to elevate the block of ice within the carriage a predetermined distance whereby kerfs of that distance will be formed in the top of the block of ice as the gang saw of the movable carriage moves over the block of ice.

In the construction herein shown, the elevating chains are provided with a rod which is slidably mounted in the slot 7² of the side bars of the platform, which allows the elevating chains to move intermittently as clearly shown in Figure 4 whereby a positive driving connection is provided for elevating the block of ice.

In order to provide means for holding the block of ice in its proper position on the platform 7 within the ice carriage, I provide side spacing members 20 and end spacing member 21, which prevent the block of ice from moving on the platform as it is raised and lowered.

The block of ice is held in position on the platform within the carriage by members 22 carried by spring arms 23, said members being provided with inclined faces so that when the block of ice is pushed into engagement with these inclined faces, the members will yield or be moved apart to allow the block of ice to pass into the ice carriage and after it has passed into the ice carriage onto the platform 7, the members will return to their original positions to lock the block of ice within the ice carriage so as to prevent it from moving.

Disposed on top of the frame is an electric motor 24, the drive shaft 25 of which is provided with three pulleys over which pass drive belts 26 which pass over pulleys 27, 28 and 29 carried respectively by horizontally disposed shafts 30, 31 and 32.

The shaft 30 is provided with beveled gears 33 and 34 which mesh with beveled gears 35 and 36 carried by vertically disposed shafts 37 and 38 mounted in suitable bearings 39 carried by bearings 40 of the shafts 30, said shafts 38 and 39 carrying cut off saws 41 and 42 which are horizontally disposed as clearly shown, in position to cut off the cubes or slabs previously formed as will be hereinafter fully described.

Figure 1:
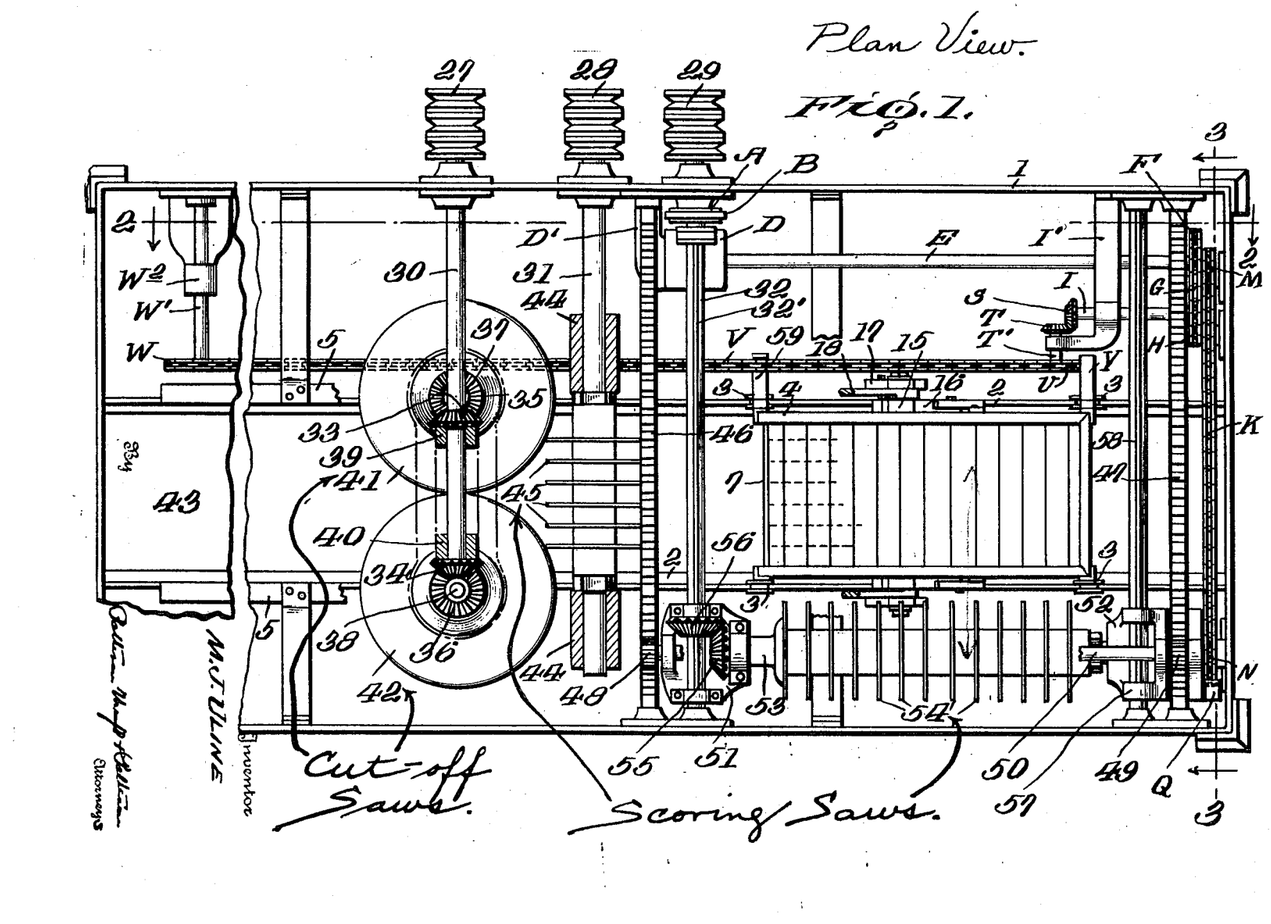
Figure 1 is a plan view, partly in section, of an ice cutting machine constructed in accordance with my invention.
Figure 2:
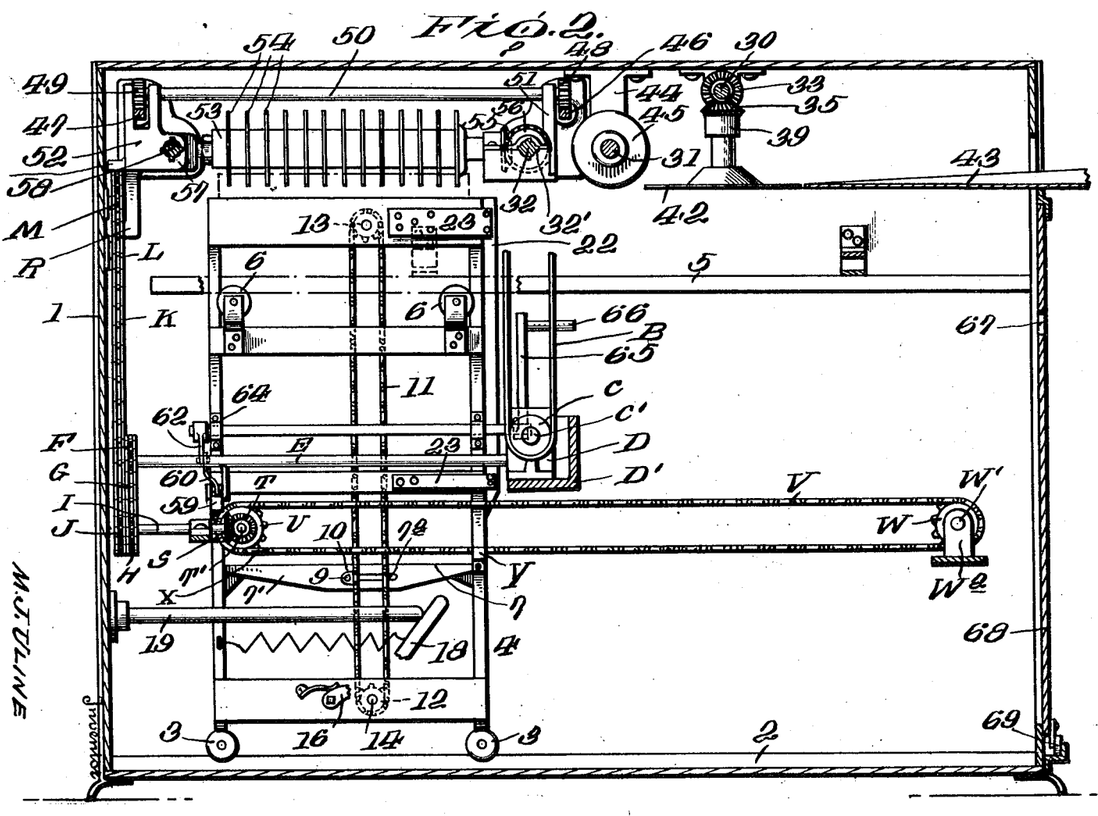
Figure 2 is a longitudinal vertical section taken on line 2—2 of Figure 1.

A delivery trough 43 is disposed adjacent the saws as shown in Figure 2 to allow the cubes or slabs to be discharged from the machine.

The shaft 31 is mounted in suitable bearings 44 and carries a plurality of saws 45 arranged parallel to one another in order to form a gang saw and these saws are preferably secured on the shaft and spaced apart in such a manner that they can be adjusted if it should be desired to cut kerfs at different distances apart in the top of the block of ice as will be hereinafter fully described.

Horizontally disposed within the frame 1 are racks 46 and 47 on which are mounted pinions 48 and 49 carried by a shaft 50 mounted in carriage members 51 and 52 in which is mounted a saw arbor 53 carrying a plurality of circular saws 54 arranged parallel with one another and spaced apart by spacing members and so mounted that they can be readily assembled or disassembled on the shaft by changing the size of the spacing member, the number of saws can be increased or decreased so as to increase and decrease the number of kerfs formed in the top of the block of ice.

The saw arbor 53 carries a beveled pinion 55 which meshes with a beveled pinion 56 which is mounted on the shaft 32 which is provided with a spline 32' and pinion 56 travels on the spline so as to form a driving connection whereby when the motor is in operation through the drive pulley 29, the shaft 32 will be revolved and through the spline connection with the pinion 56, the pinion 55 will be rotated so as to rotate the circular saws.

The carriage member 52 is provided with bearings 57 to receive a spline shaft 58 mounted in the frame 1 to form a support for the saw carriage formed by the carriage members 51, 52, arbor 53 and shaft 54 whereby the saw with its set of gang saws can be reciprocated across the top of the ice as will be hereinafter fully described.

Figure 3:
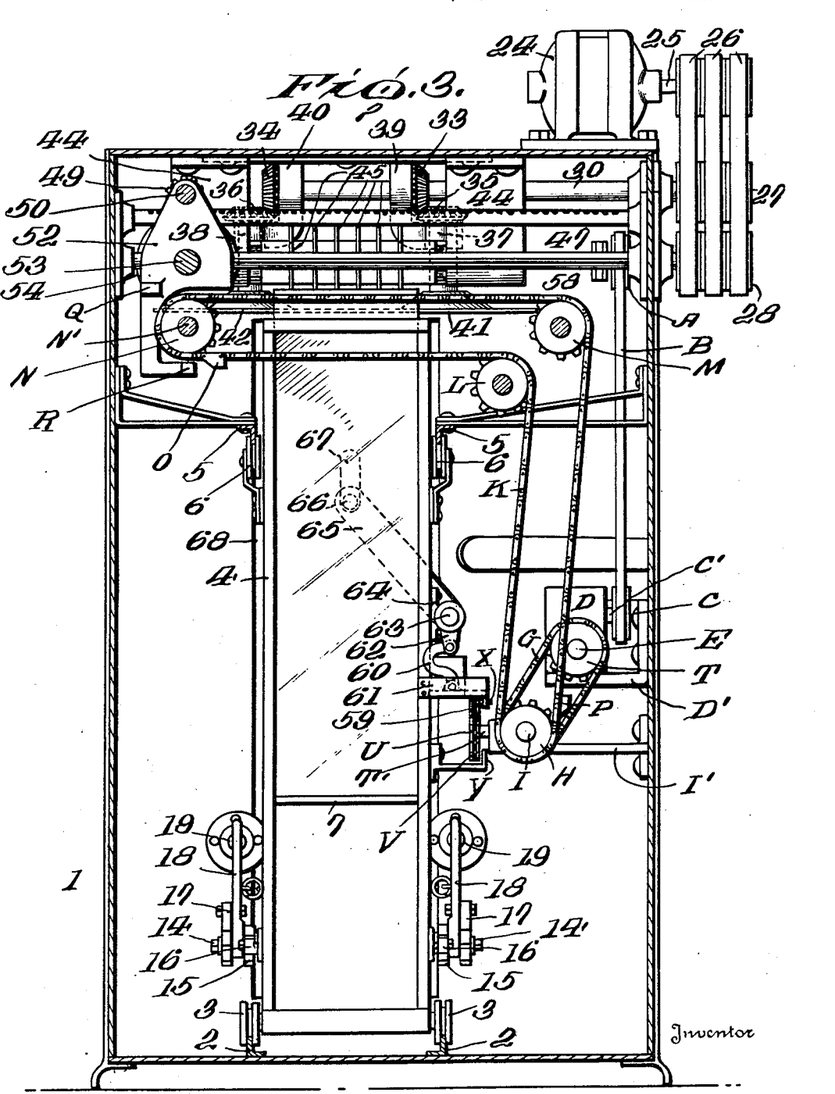
Figure 3 is a section taken on line 3—3 of Figure 1.

The shaft 32 carries a pulley A over which passes a drive belt B traveling over a pulley C carried by shaft C' of a reduction gear D mounted in a bracket D' on the frame 1 and said reduction gear is provided with outwardly projecting shaft E carrying a sprocket wheel F over which passes a drive chain G which passes over a sprocket H on the shaft I, which in turn is provided with a sprocket J over which passes a drive sprocket chain K, which passes over idle sprockets L and M and around a sprocket wheel N carried by shaft N' disposed beneath the path of travel of the saw carriage as clearly shown in Figure 3.

The drive chain K is provided with driving lugs O and P so positioned on the opposite side of the chain as to intermittently engage projections Q and R in one end of the saw carriage as clearly shown in Figure 3, whereby when one driving lug has moved the carriage into the position shown in Figure 3, it will move out of the path of the projection Q and the drive chain will continue to travel until the drive lug P strikes the projection R which will move the carriage across the block of ice so as to form a plurality of kerfs in the top thereof transverse of the cake of ice.

This provides means for intermittently reciprocating the saw carriage so as to allow the carriage to be moved out of the path of travel of the ice carriage whereby the ice in said carriage will be raised by the elevating mechanism so that when the other driving lug of the driving chain engages its projection, the carriage will be moved across the block of ice with the rotary saws in position to cut kerfs therein.

The shaft I which is mounted in a suitable bearing of a bracket I' is provided with a beveled gear S which meshes with a beveled gear T carried by a shaft T' mounted in the bracket I' and provided with sprocket wheel U over which passes a drive sprocket chain V which passes over an idle sprocket W carried by a shaft W' mounted in a bearing W² as clearly shown in Figure 2, which drive chain is adapted to reciprocate the ice carriage as will be hereinafter fully described.

Figures 8, 9:
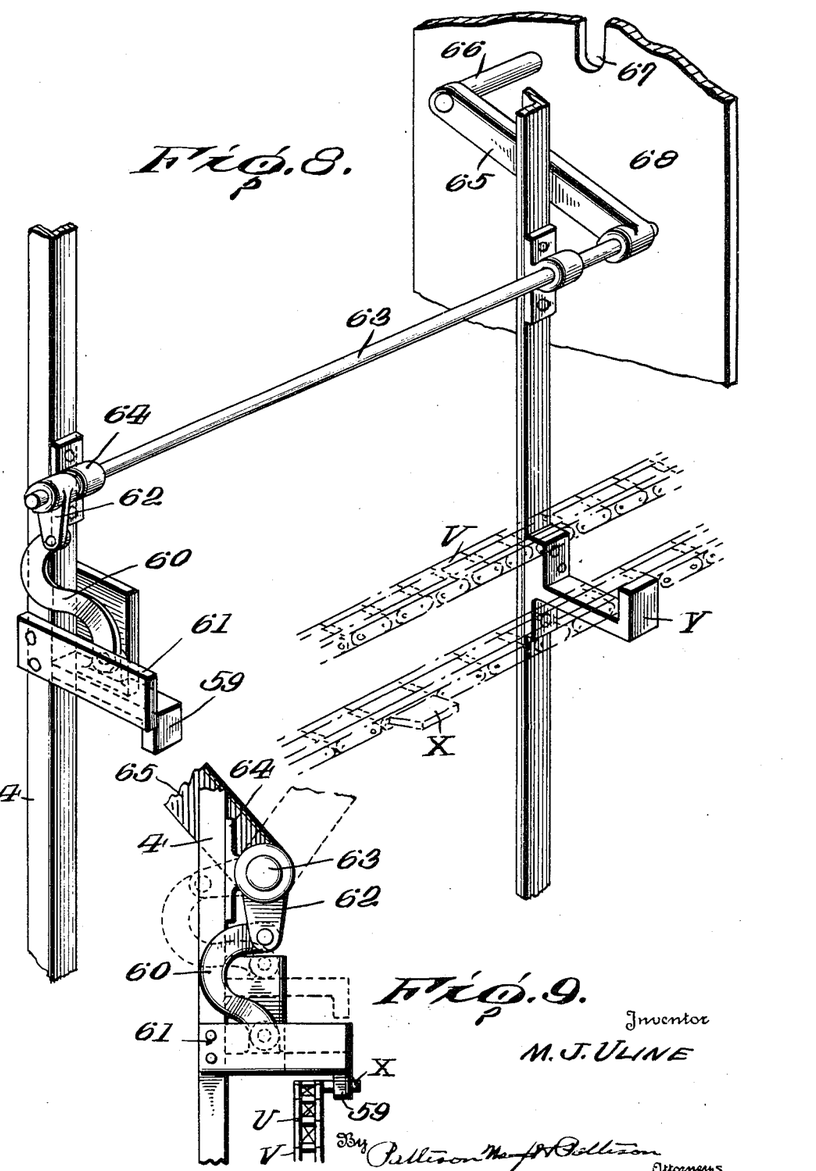
Figure 8 is a perspective view of the lever mechanism for moving the projection into and out of the path of the drive lug of the chain.
Figure 9 is a detail view showing the projection raised in dotted lines out of the path of travel of the drive lug of the chain.
Figure 10:
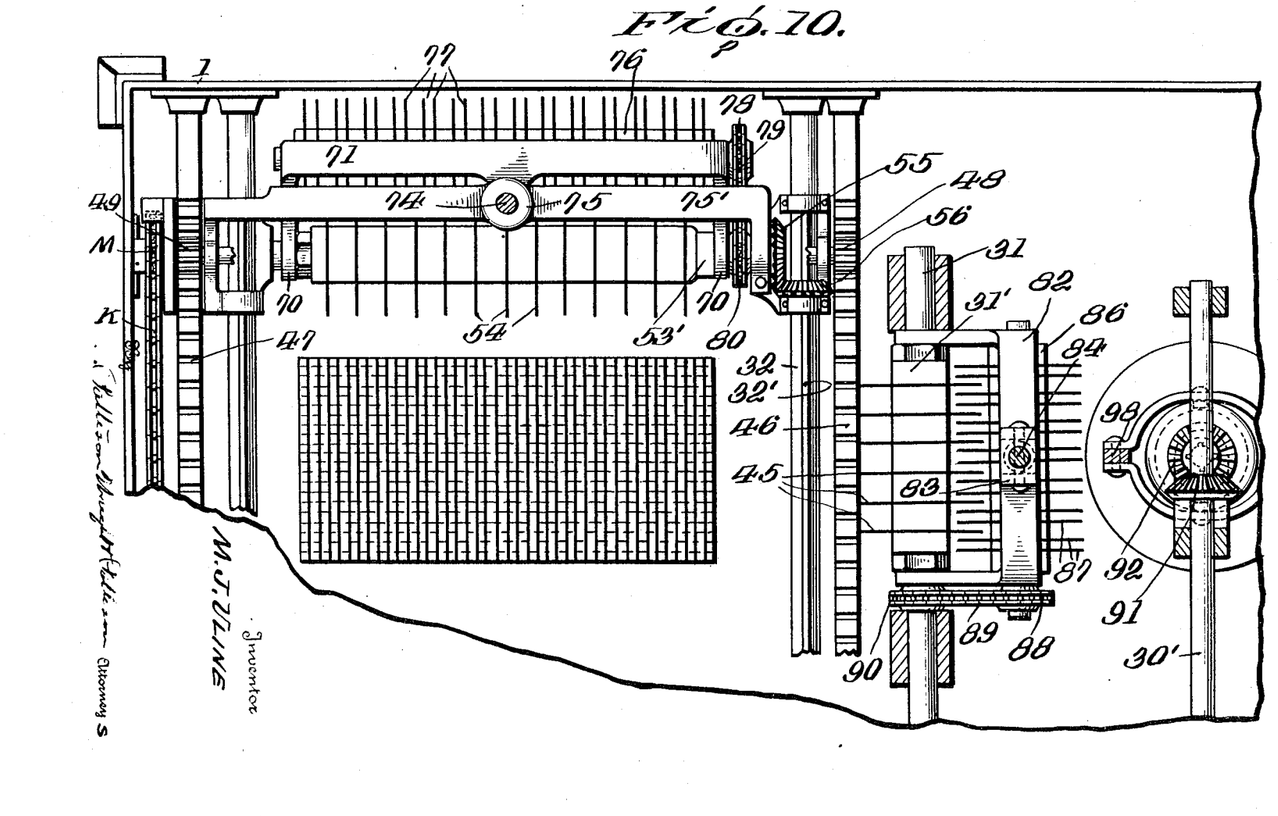
Figure 10 is a top plan view showing an ice cutting machine constructed with auxiliary gang saws.
Figures 11, 12:
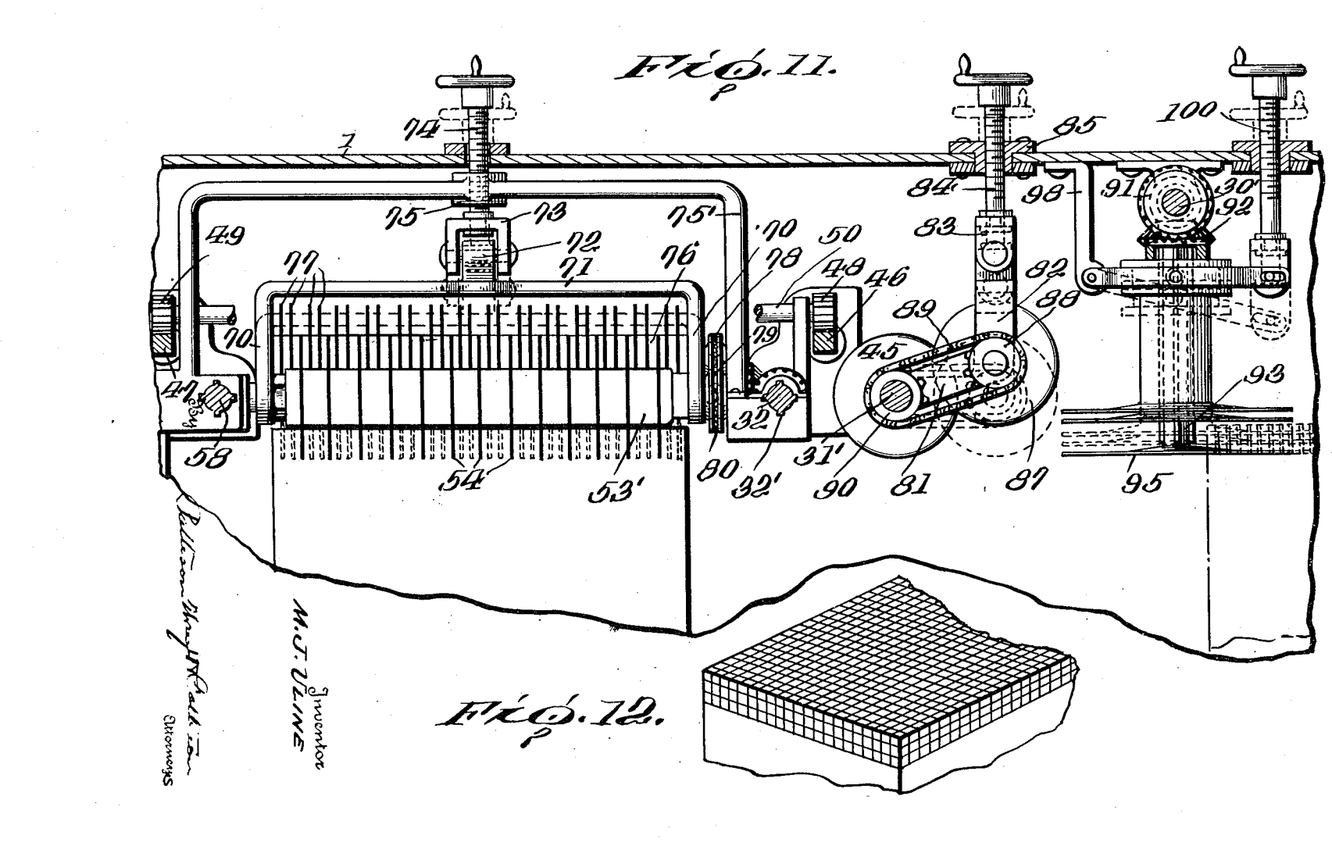
Figure 11 is a detail longitudinal section showing the portion of the machine with a series of independently adjustable cut off saws in various positions.
Figure 12 is a detail perspective view of a portion of a block of ice showing the top of the same cut into small cubes, as for example, of one-half inch size by the plurality of auxiliary gang saws and adjustable cut off saws.
Figure 13:
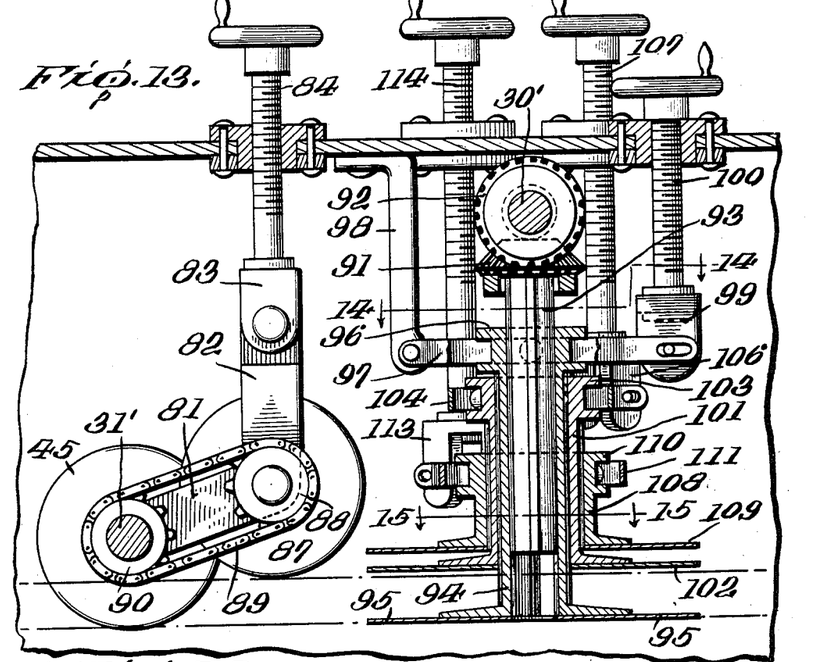
Figure 13 is a detail vertical section partly in elevation showing the independent means for adjusting the cut off saws.
Figure 14:
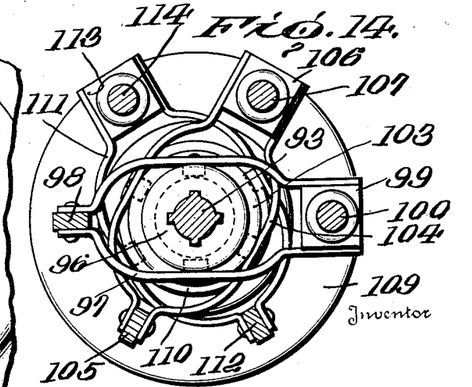
Figure 14 is a section taken on line 14—14 of Figure 13.
Figure 15:
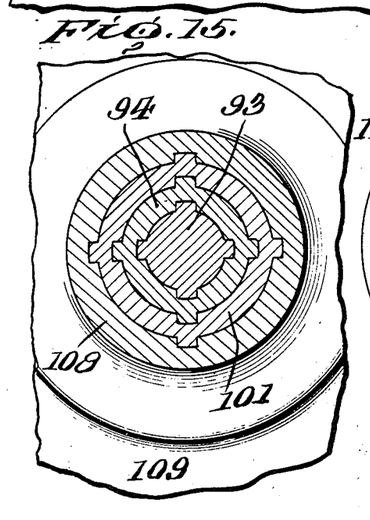
Figure 15 is a section taken on line 15—15 of Figure 13.

The drive chain V is provided with a drive lug X which is adapted to engage a movable projection 59 carried by a link 60 mounted in a bearing 61 carried by the frame of the ice carriage, said link 60 being pivotally connected to an arm 62 carried by a shaft 63 mounted in bearings 64 secured to the ice carriage frame as clearly shown in Figures 8 and 9.

The end of the shaft 63 carries a crank arm 65 provided with a handle 66 which is adapted to extend through an opening 67 in a door 68 which is mounted on rollers 69 which closes and opens the feed opening of the machine, whereby said crank arm will be in position to guard or to prevent a cake of ice from being inserted into the ice carriage when the door is closed. This prevents the carriage from being reciprocated when the door of the feed opening is open as when the door is opened, the crank arm is rocked so as to move the projection 59 out of the path of the drive lug X and by this construction the ice carriage is maintained in its proper position to receive a cake of ice when the door is open as its driving connection or driving chain is disconnected by the opening of the door by the rocking of the crank arm and when the block of ice is in position and the door is closed, the projection of the carriage is moved into the path of travel of the drive lug so as to allow the carriage to be driven thereby in order to reciprocate the same in one direction.

The opposite end of the ice carriage carries a fixed projection Y which is engaged by the drive lug X so as to move the carriage away from the feed end of the machine and it will be noted that as the chain V is driven, when the door is closed and the drive lug X comes into engagement with the projection Y the carriage is reciprocated into such position that as the drive lug rides around the sprocket W, it passes out of engagement with the projection J and the carriage stands still until the drive lug X engages the movable projection 59 which carries the carriage back to the other end of the machine in position to cause the platform to be raised so that the block of ice will be elevated into the path of travel of the circular saws carried by the reciprocating saw carriage so as to form a plurality of kerfs therein.

This provides means for intermittently reciprocating the ice carriage as it will be apparent that when the movable projection 59 is out of the path of travel of the lug X, the carriage will have been moved into a position adjacent the feed opening to receive a block of ice as the driving connection carries the carriage back to the other end and is disconnected and the carriage remains at that end until the block of ice is put into the carriage and the door is closed, which moves the movable projection 59 into the path of the driving lug X so as to carry the carriage to the other end of the machine with the block of ice.

In the driving connection for the saw carriage, the drive chain K carries two drive lugs O and P on the opposite sides and the carriage is provided with projections Q and R so disposed that when the carriage reaches the end of travel in one direction, the lug passing around the sprocket moves out of engagement with the projection Q and the carriage remains stationary until the drive lug P is brought into engagement with the projection R so as to move the carriage in a reverse direction whereby the carriage will be intermittently reciprocated in timed relation with the reciprocation of the ice carriage and as a single driving means is employed through a reduction gear for this purpose, these carriages will be operated at the proper time irrespective of the position of the movable lug of the ice carriage.

It will be apparent that this provides safety means for operating the machine without relying on the memory of an operator to start and stop the motor as the motor can run continuously without any danger of injuring the parts and when the door is open, the carriage will be brought in position to receive the block of ice.

It will be apparent that a standard size block of ice is placed through the door opening into the ice carriage and that the upper surface is provided with parallel arranged kerfs at right angles to one another by gang saws and the cubes or slabs thus formed are cut off by a horizontally disposed saw or saws and the cubes or slabs are delivered upon the delivery shelf where they will be forced outwardly into suitable receptacles for collecting the same.

In the form of ice cutting machine as shown in Figures 10 to 15, the saw arbor 53' has pivotally mounted thereon the apertured arms 70 of a swinging saw carriage 71, the yoke of which is provided with a vertical apertured lug 72 to which is pivotally connected a bifurcated member 73 which in turn has connected thereto an adjusting screw 74 mounted in a fixed nut 75 carried by a bridge member 75' of the saw carriage, said adjusting screw 74 traveling in a slot formed in the top of the main frame or housing of the machine.

The swinging saw carriage 71 carries an auxiliary saw arbor 76 provided with a plurality of circular saws 77 which, when lowered, are adapted to extend between the circular saws 54 so that kerfs will be formed in the top of the cake of ice, as for example, every one-half inch, which enables the device to form cubes of a one-half inch size.

The saw arbor 76 carries a sprocket 78 over which passes a sprocket chain 79 driven by a sprocket 80 fixed to the saw arbor 53' and the construction of the main arbor and its mounting is substantially the same as shown in the form of ice cutting machine in which the saw carriage is provided with only one set of gang saws.

The saw arbor 31' has mounted thereon arms 81 of a saw carriage 82 which has pivotally connected thereto a bifurcated member 83 carrying an adjusting screw 84 mounted in a fixed nut 85 in order to allow the carriage to be oscillated up and down and the carriage carries a saw arbor 86 having a plurality of circular saws 87 which extend in between the circular saws of the arbor 31 so as to form kerfs substantially one-half inch apart to carry out the form of one-half inch cubes.

The arbor 86 carries a sprocket 88 over which passes a chain 89 of a sprocket wheel 90 fixed on the arbor 31' for driving the circular saws 87 and it will be apparent that this set of auxiliary saws 87 and the set of auxiliary saws 77 can be swung up and down so as to move them in such a position that they will cut any desired depth and that when lowered so that their cutting edge is in a horizontal plane with the cutting edges of the circular saws 45 and 54, kerfs one-half inch apart will be formed in the top of a block of ice.

In order to provide means for cutting off the top of the cake of ice after the kerfs have been formed, in order to form cubes or slabs of different sizes, I provide the shaft 30' with a beveled gear 91 which meshes with a beveled gear 92 carried by a shaft 93 mounted in suitable bearings and has splined thereon a tubular saw arbor 94 carrying a horizontally disposed saw 95 at its lower end and provided with a grooved collar 96 at its upper end into which extends pins of a pivoted yoke 97 mounted on a bracket 98. The free end of the pivoted yoke 97 has loosely connected thereto a member 99 to which is connected an adjusting screw 100.

Splined on the arbor 94 is a tubular arbor 101 which is provided with a horizontally disposed saw 102 at its lower end and is provided at its upper end with a grooved collar 103 into which extends pins of a yoke 104 mounted on a bracket 105 and having connected loosely at its free end a member 106 to which is connected an adjusting screw 107.

Splined on the tubular arbor 101 is a tubular arbor 108 which is provided at its lower end with a horizontally disposed saw 109 and has a grooved collar 110 at its upper end into which extends pins of a yoke 111 mounted on a bracket 112 and having a member 113 loosely connected to the free end of said yoke to which is connected an adjusting screw 114 for adjusting the same.

This provides means for independently adjusting the horizontally disposed cut off saws 95, 102 and 109, whereby said saws can be set in different positions to form cubes or slabs and it will be noted that instead of using a pair of cut off saws in this construction, a single cut off saw is employed and I wish it to be clearly understood that in constructing an ice cutting machine in accordance with my invention, the cubes or slabs can be cut off by a single or a double saw and therefore I do not wish to limit myself to the use of any particular number of cut off saws as I am aware that the cubes or slabs will be cut off by employing a single large saw or a pair of small saws so disposed in the path of travel of the block of ice that the cubes and slabs formed by the kerfs will be cut off as the block is brought into engagement with the horizontally disposed cut off saws.

While I have shown a machine for cutting ice cubes and slabs in one form employing two units of saws traveling at right angles to two units of other saws for forming kerfs at right angles to one another, I do not wish to limit myself to the use of any number of gang saws as I am aware that it is only necessary in forming cubes and slabs of a predetermined size to employ one gang saw disposed at right angles to another gang saw and that a single or a number of horizontally disposed cut off saws can be employed without departing from the spirit of my invention which consists broadly in providing means for receiving and moving a standard size block of ice first vertically into such a position that the upper end will have transverse kerfs formed therein as the saw arbor carrying a plurality of circular saws moves across the block of ice. The block of ice is then carried into engagement with a second set of gang saws where kerfs are formed in the top thereof at right angles to the previously formed kerfs and as the block of ice leaves these gang saws, it is brought into engagement with the horizontally disposed cut off saw which cuts the entire end of the cake of ice off in a plane with the bottom of the kerfs so as to allow the cubes to be deposited upon the delivery shelf.

This is the operation of a machine constructed as disclosed in Figures 1 to 9 and it will be apparent that the operation of a machine constructed as disclosed in Figures 10 to 15 will be substantially the same with the exception that the kerfs will be formed closer together at right angles to one another and one or more horizontal cuts will be made in the top of the ice so as to form cubes or slabs of different sizes as the case may be.

When the door is open, the lever 65 is moved from across the door opening and the carriage is at the end of the machine in position to receive the ice, the platform being in a lowered position. When the block of ice has been positioned within the ice carriage and the operator having previously started the motor, the door is shut either by swinging the crank or by pushing the door closed. Whether the door is moved or the lever is swung, when the door is moved in closed position, the movable projection 59 of the ice carriage is lowered so that the lug X of the drive chain V will engage the same and as the chain is moving in a direction away from the feed end of the machine, the carriage is moved towards the opposite end of the machine. Before it reaches the end of its travel, the elevating chain is operated through the pawl and ratchet mechanism by coming in contact with the projections 19 and the platform 7 is raised. In starting the machine, it is necessary to allow it to run a sufficient time to cause the block of ice to be raised above the carriage and as the block of ice is of an exact size and as the platform is in lowered position when the block is placed thereon, it will be raised an inch and a half or a predetermined distance each time the ratchet mechanism is brought into engagement with the projections so that when the ice moves above the top of the carriage it is moved into such a position that the saws of the saw carriage can cut parallel arranged kerfs in the top thereof. Through the driving mechanism for the saw carriage it remains stationary. When the driving lug X of the driving chain V now engages a fixed projection Y, it moves the ice carriage into a reverse direction so as to move the block of ice into engagement with a plurality of saws on the fixed arbor which cuts kerfs in the top of the ice at right angles to the previously formed kerfs. A further movement of the carriage then brings the end of the block of ice into contact with the horizontally disposed cut off saw, which cuts off the cubes or slabs and deposits the same on the delivery shelf. The carriage is now returned to the feed end and the operation is repeated until substantially the entire standard sized block of ice has been cut into cubes or slabs.

From the foregoing description it will be apparent that I have provided a fool-proof ice cutting machine for cutting a standard size block of ice into cubes or slabs with means for adjusting the same to cut various size cubes or slabs and the operation is continuous until the entire standard block has been utilized and after the machine is once started, it works automatically as the ice carriage is intermittently reciprocated and the saw carriage is intermittently reciprocated in timed relation thereto and in connection with the means for elevating the block of ice the cubes or slabs are cut therefrom, it is only necessary for an operator to place a block of ice in the ice carriage and close the door and the entire block will be cut up into the desired shapes.

While I have shown certain details of construction for elevating the platform of the ice carriage and for adjusting the saws and for driving the carriages, I wish it to be clearly understood that I do not wish to limit myself to these details of construction as my invention consists in providing an ice cutting machine with a movable carriage to receive a standard size block of ice, which carriage is intermittently reciprocated and at the same time the block of ice is intermittently elevated so that it can be acted on by a set of gang saws carried by a movable carriage, then acted on by a set of gang saws arranged in the path of travel of the block on the carriage and then into engagement with a cut off saw or saws so that the block will be cut up into cubes or slabs.

In the construction of apparatus herein shown, a standard size cake of ice is inserted into the machine at the same end from which the cubes are delivered and the cake of ice is carried longitudinally in the machine and when it reaches the limit of its movement it is elevated and a series of gang saws are moved transversely across the cake of ice to form a plurality of kerfs. The cake of ice is then reciprocated in a reverse direction and as it returns to its original position within the machine, a series of kerfs are formed in the top at right angles to the previously formed kerfs and as the cake of ice moves further, it is brought into engagement with the cut off saws so as to cut off the cubes or blocks previously formed and these cubes are delivered upon a delivery shelf to deliver the cubes outside of the machine.

While in the drawings I have failed to show a machine enclosed in a casing, I wish it to be understood that I reserve the right to enclose the machine in a casing in order to protect the same and that I am aware that the delivery shelf can be extended to deliver the cubes from the side of the machine as with the construction of door operation herein shown, this will move the delivery shelf out of the path of the doors.

From the above it will be seen that a carriage is provided which is reciprocated and has means for elevating the block so as to bring it into the path of a plurality of saws, one set of saws being carried by a movable saw carriage, the saw carriage and driving means for the ice carriage being in timed relation with one another.

What I claim is:

1. In an ice cutting machine of the kind described, the combination with a reciprocating ice carriage adapted to support a block of ice, means for intermittently elevating the ice in the ice carriage, of a reciprocating saw carriage having a gang saw adapted to move across the top of said block of ice for forming parallel kerfs therein when said ice carriage reaches its limit of travel at one end, a stationary gang saw arranged in the path of travel of said block of ice in said carriage for cutting kerfs in the block at right angles to the previously formed kerfs before it reaches its limit of travel at the other end and a saw disposed horizontally in the path of travel of said block of ice for cutting off the end of the ice as it reaches its other limit of travel.

2. In a machine for cutting blocks of ice into cubes or slabs, the combination with an intermittently reciprocating carriage for supporting and intermittently elevating a block of ice, of a saw carriage having a gang saw adapted to move transversely across said block of ice when said ice is stationary, a fixed gang saw arranged in the path of travel of said block of ice on said carriage for cutting kerfs at right angles to the previously formed kerfs when said block is moving in said carriage, a horizontally disposed saw arranged in the path of travel of said block of ice for cutting off the previously formed cubes or slabs from said block and means for driving said ice carriage and saw carriage in timed relation with one another.

3. In a machine for cutting blocks of ice into cubes or slabs, the combination with a frame having a feed opening at one end, of an intermittently reciprocating ice carriage mounted within said frame having means for supporting and elevating a block of ice, a reciprocating saw carriage provided with a gang saw adapted to move across said block when said block is stationary, a stationary gang saw in the path of travel of said block of ice, a cut off saw and means for intermittently moving said ice carriage and saw carriage to initially cause the saw carriage to move transversely over the end of the block of ice when said block is stationary to form parallel kerfs and then to move the ice carriage into engagement with the fixed gang saws to form parallel kerfs at right angles to the previously formed kerfs and finally moving the block of ice into engagement with a cut off saw for cutting the cubes or slabs from the block of ice.

4. In a machine for cutting blocks of ice into cubes or slabs, the combination with an ice carriage, of a saw carriage having a pair of gang saws one adjustable in respect to the other for cutting parallel kerfs in the top of said block of ice within said carriage, a fixed gang saw arranged in the path of said block of ice, an auxiliary gang saw adjustably mounted in respect to the fixed saw and a plurality of horizontally disposed cut off saws independently mounted for cutting off the previously formed blocks.

5. In a machine of the kind described, the combination with means for supporting and reciprocating a cake of ice on end intermittently, a reciprocating saw carriage provided with a gang saw for forming transversely arranged parallel kerfs in the top of said cake of ice, a fixed gang saw arranged in the path of travel of said cake of ice, a cut off saw arranged in the path of said cake of ice and means for intermittently raising said cake of ice in said supporting means by the momentum of said supporting means.

6. In a machine for cutting up large cakes of ice into small cubes or blocks, the combination with means for supporting and holding a cake of ice on end, of a saw carriage provided with a gang saw adapted to be intermittently reciprocated for cutting transverse parallel arranged kerfs in the top of a cake of ice, a fixed gang saw arranged in the path of travel of said cake of ice and adapted to form parallel arranged kerfs at right angles to the previously formed kerfs, a cut off saw disposed in the path of travel of said cake of ice for cutting off the previously formed blocks or cubes and means for intermittently raising said cake of ice within said supporting means by the momentum of said supporting means.

7. In a machine for cutting cubes or blocks of ice from a standard size cake of ice, the combination with an intermittently reciprocating ice carriage having means for supporting and intermittently elevating a cake of ice therein, an intermittently reciprocating saw carriage having a gang saw for intermittently moving over the cake of ice to form parallel kerfs therein, a fixed gang saw, a horizontally disposed cut off saw and means for intermittently reciprocating said ice carriage in timed relation with the saw carriage to first cause transverse parallel arranged kerfs to be formed in the top of the cake of ice when the cake is stationary, then parallel arranged kerfs at right angles to the previously formed kerfs by the movement of the cake of ice into engagement with the fixed gang saw and then to sever the blocks thus formed by the cut off saw.

8. A machine for cutting cakes of ice into small blocks or cubes, means for forming kerfs at right angles to one another in the end of said cake of ice, and a series of independently adjustably superposed cut off saws arranged in the path of travel of said ice for severing the cubes or blocks formed by the kerfs.

9. A machine for cutting cakes of ice into small blocks or cubes, gang saws arranged at right angles to one another, each gang saw being provided with an auxiliary movable gang saw and means for adjusting said auxiliary gang saws for cutting kerfs in the end of the cake of ice.

10. A machine for cutting cakes of ice into small cubes or blocks comprising means for intermittently reciprocating a block of ice on end, means operated by the reciprocation of said block for intermittently elevating said block, a reciprocating saw carriage adapted to move over said block to form parallel kerfs therein, a stationary saw carriage having a plurality of saws for cutting parallel kerfs at right angles to the previously cut kerfs when said cake of ice is moved into contact therewith and a horizontally disposed stationary saw arranged in the path of travel of said cake of ice for severing the previously formed cubes of ice from the block.

11. In an ice cutting machine of the kind described, the combination with an ice carriage adapted to reciprocate, of an endless chain having a drive lug cooperating with said carriage for intermittently reciprocating said carriage, means operated by the momentum of said carriage for elevating a block of ice when arranged therein, a reciprocating saw carriage adapted to move at right angles to the movement of said ice carriage and an endless chain provided with a drive lug for intermittently reciprocating said saw carriage.

12. In an ice cutting machine having gang saws arranged at right angles to one another for cutting parallel kerfs at right angles to one another in a block of ice, one being stationary and the other being movable, an ice carriage for holding a block of ice and moving said block in position to be operated on by the gang saws comprising a box-like casing, a pair of spaced endless chains mounted on opposite walls of said casing, a rod connecting said chains, a platform movably mounted in said casing having a lateral sliding connection with said rod and means for intermittently driving said chains for elevating said platform with the block of ice within said carriage.

13. In an ice cutting machine having gang saws arranged at right angles to one another for cutting parallel kerfs at right angles to one another in a block of ice, one being stationary and the other being movable, an ice carriage for holding a block of ice and moving said block in position to be operated on by the gang saws comprising a box-like casing, a pair of spaced endless chains mounted on opposite walls of said casing, a rod connecting said chains, a platform movably mounted in said casing having a sliding connection with said rod to allow said rod to move laterally in respect to said platform and pawl and ratchet mechanism for driving said chains by the momentum of said carriage for elevating said platform.

14. A machine for cutting cakes of ice into small cubes or blocks, gang saws arranged at right angles to one another, one of said gang saws being movably mounted, each gang saw being provided with an auxiliary adjustable gang saw, a movably mounted ice carriage, means for alternately moving said movable saw carriage and ice carriage in timed relation with one another and means for adjusting said auxiliary gang saws for cutting additional kerfs in the ends of the cakes of ice.

15. In an ice cutting machine of the kind described, the combination with a reciprocating ice carriage, means for intermittently reciprocating said carriage, endless chains for elevating a block of ice in said carriage, means for intermittently driving said chains by the momentum of said carriage and gang saws arranged at right angles to one another, one gang saw being movably mounted and means for alternately moving in timed relation with one another said ice carriage and saw carriage for forming transverse kerfs at right angles to one another in the top of the ice and means for severing the cubes thus formed.

16. In an ice cutting machine of the kind described, the combination with a reciprocating ice carriage, a movable and a stationary gang saw, means for alternately reciprocating said ice carriage and movable gang saw in timed relation with one another, endless chains for elevating a block of ice in said ice carriage, pawl and ratchet mechanism for driving said chains, a movable member carrying the pawl of said pawl and ratchet mechanism and means arranged in the path of travel of said movable member for operating said ratchet mechanism for elevating a cake of ice in said ice carriage to form transverse kerfs at right angles to one another in the top of said ice and for severing the cubes thus formed.

17. In an ice cutting machine of the kind described, the combination with an ice carriage adapted to reciprocate, a fixed and a movable member carried by said ice carriage, an endless chain having drive lugs cooperating with said fixed and movable members of said ice carriage for intermittently reciprocating said carriage, means operated by the momentum of said carriage for elevating a block of ice when arranged therein, a reciprocating saw carriage adapted to move at right angles to the movement of the ice carriage, members carried by the saw carriage, endless chains provided with drive lugs cooperating with said last mentioned member for intermittently reciprocating said saw carriage and means for moving said movable member out of the path of travel of one of said drive lugs for stopping the movement of said ice carriage.

18. In an ice cutting machine of the kind described, the combination with an ice carriage adapted to be reciprocated, a movable and a fixed gang saw for cutting kerfs in the end of a cake of ice carried by said ice carriage, an endless chain having driving lugs cooperating with said ice carriage for intermittently reciprocating said carriage, means operated by the movement of said carriage for elevating blocks of ice when arranged therein, an endless chain provided with a drive lug for intermittently reciprocating said movable gang saw and means for disconnecting said ice carriage driving means to allow said ice carriage to remain stationary to receive a block of ice.

19. A machine for cutting cakes of ice into small cubes or blocks comprising means for intermittently reciprocating a block of ice on end, means for intermittently elevating said block while in motion, a reciprocating saw carriage having a plurality of saws adapted to move over said block to form parallel kerfs therein, a stationary saw carriage having a plurality of saws for cutting parallel kerfs at right angles to the previously cut kerfs when said cake of ice is moved into contact therewith, means for intermittently reciprocating said saw carriage and ice carriage at right angles to one another and in timed relation with one another, a pair of oppositely rotating horizontally disposed stationary saws arranged in the path of travel of said cakes of ice for severing the previously formed cubes of ice from said block as it reaches its limit of travel and means disposed adjacent said saws for collecting and discharging said cubes.

20. A machine for cutting blocks of ice into small cubes or slabs, gang saws arranged at right angles to one another for cutting kerfs at right angles to one another in the cake of ice, one of said gang saws being provided with an auxiliary movably mounted gang saw, means for adjusting said auxiliary gang saw for cutting additional kerfs in the block of ice to the previously formed kerfs and horizontally disposed saws for severing the previously formed cubes or slabs of ice from said block.

21. In an ice cutting machine having gang saws for cutting parallel kerfs at right angles to one another in a block of ice, an ice carriage for holding a block of ice and moving said block in position to be operated on by said gang saws, a platform movably mounted in said ice carriage, endless chains disposed on the opposite sides of said ice carriage, means carried by said chains for supporting said platform and pawl and ratchet mechanism for driving said chains in unison for elevating said platform and for allowing said platform to return to its original position.

MIGIEL J. ULINE.